Oct. 1, 1963     E. M. WHITLEY     3,105,618

MICRO PIPETTE FLUID DISTRIBUTOR

Filed Sept. 21, 1960

ERNEST M. WHITLEY
INVENTOR

BY *Flehr and Swain*
ATTORNEY

United States Patent Office 3,105,618
Patented Oct. 1, 1963

3,105,618
MICRO PIPETTE FLUID DISTRIBUTOR
Ernest M. Whitley, Palo Alto, Calif., assignor to Beckman Instruments, Inc., a corporation of California
Filed Sept. 21, 1960, Ser. No. 57,576
9 Claims. (Cl. 222—207)

This invention relates generally to a micro pipette and more particularly to a micro pipette utilizing a fluid distributor.

Micro pipettes having a deformable or squeeze bottle forming a lower liquid storage compartment, an upper temporary holding chamber communicating therewith, and a measuring tube which extends into the upper chamber are known in the prior art. A tube provides communication between the storage compartment and the temporary holding chamber so that liquid can be transferred in both directions between the compartment and chamber.

The measuring tube has one end communicating with the interior of the temporary holding chamber and its other end adapted to deliver liquid. A hole or opening is formed in the chamber and provides means for selectively exposing the interior of the temporary holding chamber to the surrounds.

Operation to dispense a predetermined amount of liquid is as follows: (1) the squeeze bottle is deformed, forcing the liquid upwardly from the storage compartment into the temporary holding chamber; (2) the hole or opening formed in the temporary holding chamber is closed when the liquid submerges the end of the measuring tube and the pressure in the temporary holding chamber increases forcing the liquid into the measuring tube to fill the same; (3) when the tube is filled, the hole is opened; (4) the bottle is released whereby the liquid flows back into the storage compartment; (5) the opening formed in the chamber is closed and the bottle again squeezed, forcing liquid upwardly into the temporary holding chamber whereby the pressure increases and forces the liquid from the measuring tube to deliver the same; and (6) the squeezing can continue to again fill the measuring tube. Alternatively, the bottle may be released to allow the liquid to flow back into the storage compartment. In the first instance, the subsequent steps are 3 et. seq.; in the second instance, the subsequent steps are 1 et seq.

In the prior art the tube communicating between the storage compartment and temporary holding chamber is open at its upper end. As a result, liquid may be injected into the temporary holding chamber at a high velocity striking the walls of the temporary holding chamber and the opening. The liquid may splatter or flow outwardly through the hole and possibly strike an operator. Since fluids which are contained in the pipette may be caustic or corrosive, it is desirable to provide means for safeguarding against such splatter or flow.

It is an object of the present invention to provide an improved pipette in which liquid splatter or flow is minimized.

It is another object of the present invention to provide a pipette which includes deflection means in association with the tube communicating between the storage compartment and the temporary holding chamber to deflect the stream of liquid flowing upwardly through the same.

It is another object of the present invention to provide a pipette including a fluid distributor which breaks the stream into multiple smaller streams and deflects the streams sideways against the walls of the temporary holding chamber.

As is well known, many liquids which are employed are subject to oxidation, and thus it is desirable to prevent splashing and excessive mixing with the air in the temporary holding chamber.

It is another object of the present invention to provide a fluid distributor which minimizes splashing of the liquid to reduce oxidation.

Another object of the present invention is the provision of a fluid distributor which occupies a portion of the volume of the temporary holding chamber whereby less liquid is required.

These and other objects of the invention will become more clearly apparent from the following description when taken in conjunction with the accompanying drawing.

Referring to the drawing.

Figure 1:
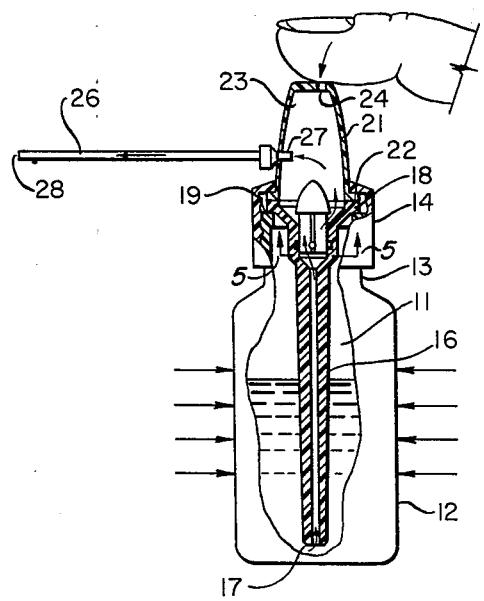
FIGURE 1 is a side elevational view, partly in section, showing a pipette incorporating the present invention.

Referring to FIGURE 1, there is shown a micro pipette which incorporates the present invention. The pipette includes a storage compartment 11 formed by a deformable bottle 12 such as a plastic squeeze bottle. The neck 13 of the bottle threadably receives a cap 14. A stand pipe or tube 16 extends downwardly into the storage compartment. Its lower end 17 is below the level of the liquid carried within the storage compartment. The upper end of the stand pipe or tube is flared outwardly and provided with a flange 18. The flange 18 rides on the upper surface 19 of the neck 13. An inverted cup-like member 21 provided with a flange 22 forms part of the temporary holding chamber with the flared portion of the tube forming the other portion. The flange 22 cooperates with the upper surface of the flange 18 to define the liquid tight temporary holding chamber 23. The cup-like member is provided with a vent hole or opening 24 which provides communication between the chamber 23 and the surrounds. A measuring tube 26 has one end 27 communicating with the interior of the chamber and its other end 28 adapted to deliver liquid.

The upper end of the tube 16 is provided with deflection means for deflecting and directing the fluid stream outwardly against the walls of the chamber 23 to prevent splattering and escape of fluid through the vent hole 24. It is also observed that this wall minimizes mixing of the fluid with the air inside the chamber.

Figure 2:
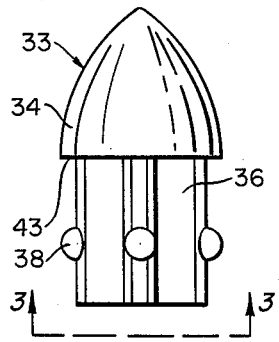
FIGURE 2 is an enlarged view showing a fluid distributor.
Figure 4:
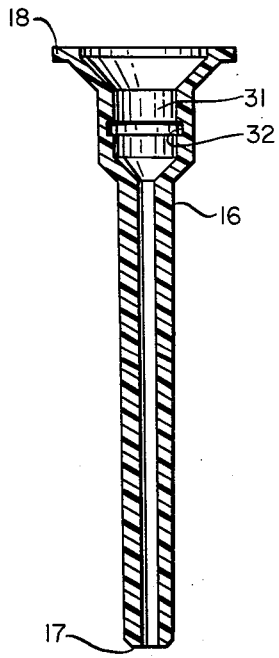
FIGURE 4 is an enlarged sectional view showing the tube which provides communication between the lower storage compartment and the temporary holding chamber.
Figure 3:
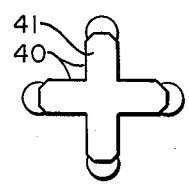
FIGURE 3 is a view taken along the line 3—3 of FIGURE 2.
Figure 5:
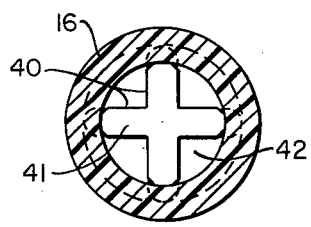
FIGURE 5 is a sectional view taken along the line 5—5 of FIGURE 1.

The upper end of the stand pipe 16 includes an enlarged bore 31 having an annular internal notch 32. A deflecting member 33, FIGURE 2, has an enlarged mushroom-shaped upper portion 34 and a lower portion 36 adapted to fit within the bore 31. The lower portion of the deflecting member is provided with a plurality of spaced rounded protrusions 38 which are adapted to snap into the slot when the parts are mated to retain the deflecting member. The lower portion 36 of the deflecting member may be longitudinally grooved at 40 as shown in cross section in FIGURE 3. The rib portions 41 contact the walls of the stand pipe. The grooves 40 and adjacent wall portions form channels 42 for directing the fluid upwardly against the under surface 43 of the enlarged portion 34 of the deflection member to deflect the liquid outwardly against the conical portion of the stand pipe. The action is then an action of deflecting outwardly and preventing frothing and splattering against the walls of the chamber.

The stand pipe, squeeze bottle, inverted cup-shaped member, and the cap 14 may all be formed from plastic material.

I claim:

1. In a pipette for delivery of measured volumes of liquid having a storage compartment for storing liquid to be measured, a temporary holding chamber, a measuring tube having one end communicating with the interior of the temporary holding chamber and its other end adapted to deliver a measured amount of liquid, an opening formed in said temporary holding chamber above the measuring tube to provide direct communication between the interior of the temporary holding chamber and the surrounds, a communicating tube having one end communicating with the temporary holding chamber and its other end extending into the storage compartment whereby liquid may be transferred through the tube between the storage compartment and the holding chamber, the improvement wherein said communicating tube includes an upper portion with an enlarged bore, an internal groove formed in said bore, deflecting means for deflecting the fluid flowing into the temporary holding chamber including a lower cylindrical portion adapted to fit in the enlarged bore of the communicating tube and an enlarged upper portion adapted to deflect the liquid stream, projections formed on said lower portion, said cylindrical portion being accommodated in the enlarged bore of the communicating tube and said projections riding within the groove to lock said deflecting means into the communicating tube.

2. In a pipette for the delivery of measured volumes of liquid having a storage compartment for storing a liquid to be measured, a temporary holding chamber including an opening adapted to provide communication between the interior of the temporary holding chamber and the surrounds, a measuring tube having one end communicating with the holding chamber, a communicating tube having first and second ends, said first end being flared outwardly to form a funnel-shaped deflecting and draining surface communicating with the temporary holding chamber, said second end extending into the storage compartment, said temporary holding chamber being formed by an inverted cup-shaped dome adapted to cooperate with said surface to define therewith said temporary holding chamber and a fluid deflecting member having a deflecting portion supported intermediate the ends of the funnel-shaped surface cooperating with the first end of the communicating tube for deflecting a fluid stream outwardly along the funnel-shaped surface as it travels upwardly into the temporary holding chamber.

3. Apparatus as defined in claim 2 wherein said deflecting means is formed as a plug-shaped member having a lower portion and an upper enlarged dome-shaped portion, said communicating tube serving to axially receive the lower portion and to hold same spaced therefrom to form axially extending constricting passages therealong.

4. A pipette for delivery of measured volumes of liquid comprising a container for liquid in storage, means for applying pressure to liquid in said container, a temporary holding chamber, a continuously open tubular channel between said holding chamber and said storage container and disposed to transmit liquid therebetween from each to the other, the upper end of said channel terminating in an outwardly and upwardly flared portion forming a bottom surface of said chamber, a shield retained spaced from and covering said upper end of said channel and disposed to deflect, toward said flared portion, liquid moving under pressure upwardly through said channel, a measuring tube having a first end terminating to atmosphere and a second end terminating in said chamber at a level above the upper end of said channel, a vent in said chamber above the measuring tube leading directly to atmosphere and adapted to be covered by an operator.

5. In a pipette for delivery of measured volumes of liquid having a storage compartment for storing liquid to be measured, a temporary holding chamber, a measuring tube having one end communicating with the interior of the temporary holding chamber, the other end being adapted to deliver the contents of said tube, an opening formed in said temporary holding chamber above said measuring tube to provide communication between the interior of the temporary holding chamber and the surrounds, a communicating tube having one end communicating with the temporary holding chamber and its other end extending into the storage compartment and disposed to pass liquid off and away from said one end of said measuring tube to interpose a volume of air between liquid in said measuring tube and said storage compartment, a deflecting member retained in fixed spaced relation away from said one end of the communicating tube to deflect laterally the fluid of a liquid stream as it moves from the storage compartment into the temporary holding chamber via said communicating tube.

6. Apparatus as in claim 5 wherein said deflecting member is carried in the bore of the upper end of the communicating tube.

7. Apparatus as in claim 5 wherein said deflecting member includes a lower portion displacing a substantial volume of said holding chamber and an upper enlarged portion, the upper end of said communicating tube serving to receive the lower portion to hold the last named means.

8. Apparatus as in claim 7 wherein said lower portion is elongated and formed with a plurality of longitudinal grooves whereby there is formed a plurality of passages between the communicating tube and last named means for directing the fluid.

9. A pipette for delivery of measured volumes of liquid comprising a container for liquid in storage, means reacting to external pressure for applying pressure to liquid in said container, a temporary holding chamber, a continuously open tubular channel between said holding chamber and said storage container and disposed to transmit liquid therebetween from each to the other, the upper end of said channel terminating in the bottom surface of said holding chamber to provide the bottom surface with drainage to remove liquid from said holding chamber via said tubular channel, a deflecting shield retained spaced from and adjacent to the upper end of said channel, said shield being disposed to deflect towards said bottom surface, liquid moving under pressure upwardly through said channel, and means for retarding fluid flow moving in opposite directions via said channel to minimize oxidation of the fluid, a measuring tube having a first end terminating to atmosphere and a second end terminating in said chamber at a level above the upper end of said channel, a vent in said chamber leading to atmosphere and adapted to be covered by an operator, whereby, with said vent open, pressurizing liquid in said storage container forces said liquid into said chamber deflected by said shield to permit loading said measuring tube when said level is exceeded, and whereby removal of the applied pressure permits return of said liquid to storage via said channel thereby leaving a volume of air interposed between said storage and said other end of said tube so that subsequent pressurizing of the liquid in said chamber delivers said liquid from the tube via said first end thereof.

References Cited in the file of this patent

UNITED STATES PATENTS

| 2,729,505 | Harvey | Jan. 3, 1956 |
| 2,744,663 | White | May 8, 1956 |
| 2,808,966 | Hall et al. | Oct. 8, 1957 |
| 2,855,127 | Lerner et al. | Oct. 7, 1958 |
| 2,974,528 | Sanz | Mar. 14, 1961 |